US012591290B2

(12) United States Patent
Saranu

(10) Patent No.: US 12,591,290 B2
(45) Date of Patent: Mar. 31, 2026

(54) TECHNIQUES FOR POWER SAVINGS, IMPROVED SECURITY, AND ENHANCED USER PERCEPTUAL AUDIO

(71) Applicant: Advanced Micro Devices, Inc., Santa Clara, CA (US)

(72) Inventor: Eswar Chandra Saranu, Madhapur (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/840,381

(22) Filed: Jun. 14, 2022

(65) Prior Publication Data

US 2023/0400905 A1      Dec. 14, 2023

(51) Int. Cl.
*G06F 1/32* (2019.01)
*G06F 1/3231* (2019.01)
*G06F 21/55* (2013.01)

(52) U.S. Cl.
CPC .......... *G06F 1/3231* (2013.01); *G06F 21/554* (2013.01); *G06F 2221/034* (2013.01)

(58) Field of Classification Search
CPC ....................................................... G06F 1/32
See application file for complete search history.

(56) References Cited

U.S. PATENT DOCUMENTS

| | | | | |
|---|---|---|---|---|
| 6,331,964 B1 * | 12/2001 | Barone | .................. | G01S 13/52 |
| | | | | 367/128 |
| 9,357,320 B2 * | 5/2016 | Gelter | .................... | H04R 29/00 |
| 9,488,726 B2 * | 11/2016 | Lin | .......................... | G01S 15/08 |
| 9,689,960 B1 * | 6/2017 | Barton | ...................... | G01S 5/22 |
| 10,705,793 B1 * | 7/2020 | Young | .................... | G10L 15/22 |
| 10,986,580 B2 * | 4/2021 | Tseng | ................ | H04W 52/0229 |
| 11,217,235 B1 * | 1/2022 | Chu | ........................ | H04R 1/406 |
| 11,462,218 B1 * | 10/2022 | Gyanchandani | ........ | G06F 1/189 |
| 2014/0274203 A1 * | 9/2014 | Ganong, III | ............ | G10L 15/02 |
| | | | | 455/563 |
| 2016/0170467 A1 * | 6/2016 | Cottinet | .................. | G06F 1/324 |
| | | | | 713/322 |
| 2018/0005642 A1 * | 1/2018 | Wang | .................. | G10L 21/0208 |
| 2018/0352356 A1 * | 12/2018 | Amir | ...................... | G06F 1/3231 |
| 2019/0279641 A1 * | 9/2019 | Simileysky | ............. | G06F 3/167 |
| 2020/0047687 A1 * | 2/2020 | Camhi | .................... | G10L 15/22 |
| 2020/0057475 A1 * | 2/2020 | Ahn | ...................... | G06F 1/1605 |
| 2021/0208664 A1 * | 7/2021 | Thomas | ................ | G06F 1/1616 |
| 2021/0255319 A1 * | 8/2021 | Abdulov | .............. | G01S 15/931 |
| 2021/0327438 A1 * | 10/2021 | Chu | .................... | G08B 13/1672 |
| 2022/0004354 A1 * | 1/2022 | Nelson | .................... | G06F 3/165 |
| 2022/0178738 A1 * | 6/2022 | Mazur | ..................... | G01H 3/14 |
| 2024/0027613 A1 * | 1/2024 | Sankoda | ................ | G01S 15/04 |

* cited by examiner

*Primary Examiner* — Phil K Nguyen
(74) *Attorney, Agent, or Firm* — Volpe Koenig

(57) ABSTRACT

A technique for operating a device is disclosed. The technique includes attempting to detect presence of a user based on emitted and reflected audio signals; and controlling power state of the device based on the attempting.

20 Claims, 7 Drawing Sheets

500

TECHNIQUES FOR POWER SAVINGS, IMPROVED SECURITY, AND ENHANCED USER PERCEPTUAL AUDIO

BACKGROUND

Computers often possess a microphone and speakers. These devices are commonly used for audio recording and playback but can be employed to provide enhanced capabilities of a broader nature for the system.

BRIEF DESCRIPTION OF THE DRAWINGS

A more detailed understanding can be had from the following description, given by way of example in conjunction with the accompanying drawings wherein.

DETAILED DESCRIPTION

A technique for operating a device is disclosed. The technique includes attempting to detect presence of a user based on emitted and reflected audio signals; and controlling power state of the device based on the attempting.

Figure 1:
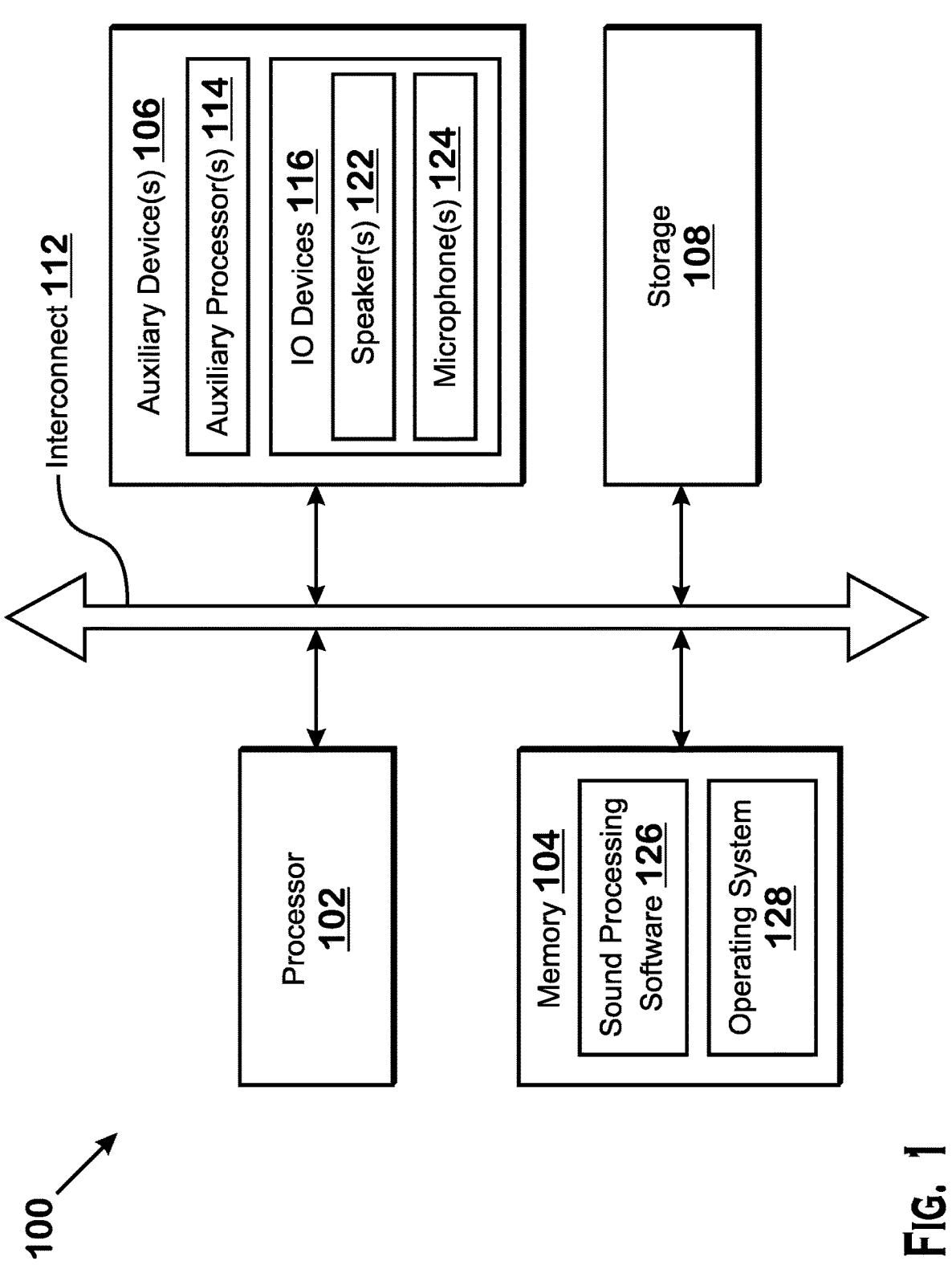
FIG. 1 is a block diagram of an example computing device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, and a storage 108. An interconnect 112, which can be a bus, a combination of buses, and/or any other communication component, communicatively links the one or more processors 102, the one or more auxiliary devices 106, the storage 108, and the memory 104.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more IO devices 116 include one or more input devices, such as a keyboard, a keypad, a touch screen, a touch pad, a detector, one or more microphone(s) 124, an accelerometer, a gyroscope, a biometric scanner, or a network connection (e.g., a wireless local area network card for transmission and/or reception of wireless IEEE 802 signals), and/or one or more output devices such as a display, one or more speaker(s) 122, a printer, a haptic feedback device, one or more lights, an antenna, or a network connection (e.g., a wireless local area network card for transmission and/or reception of wireless IEEE 802 signals).

The sound processing software 126 is configured to work in conjunction with the speakers 122, the microphone 124, and the operating system 128, to perform certain techniques related to security, user-experience, power-savings, and sound-adjustment. In general, the techniques make use of the microphone(s) 124, speaker(s) 122, or the microphone(s) 124 and speaker(s) 122 working in conjunction to adjust operations of the device 100 based on the environment around the device 100.

These techniques include, without limitation, one or more detection techniques including sensing user presence using sound emitted from the speaker(s) 122, reflected from the environment, and detected by the microphone(s) 124, mapping acoustic characteristics of the physical environment using sound emitted from the speaker(s) 122, reflected from the environment, and detected by the microphone(s) 124, and capturing and characterizing ambient sound of the environment around the device 100 using the microphone 124, in order to characterize the environment itself.

The techniques also include performing one or more of the following actions based on the one or more detection techniques: powering the device down or up (e.g., from active state to standby or other low-power state, or from standby to an active state), adjusting the output characteristics of the speakers 122, or performing security related operations. In some examples, the security related operations include characterizing the environment as secure or unsecure and adjusting the "security sensitivity" that determines what action to take in response to detecting a user leaving or returning to the device 100. In some other examples, the security related operations include informing the user (e.g., with a popup on the display of the device 100) that the user is in an insecure environment in response to detecting that the user is indeed in an insecure environment. In some examples, the security sensitivity determines how quickly to lock the device 100 in response the detecting that the user has left the device, and/or how quickly to power-up the device in response to detecting that a user has returned to the device 100. In some examples, the device 100 both adjusts the security sensitivity and informs the user that the user is in an insecure environment.

In some examples, the device 100 implements one or all of the following techniques: a user detect and power down technique, an adjust security sensitivity technique, a user detect and power on technique, and an adjust audio settings technique.

In some examples, the user detect and power down technique includes, while the device 100 is considered powered up (e.g., not locked and not on standby), periodically acoustically polling the environment to detect presence or absence of a user. In the event that a user is not detected, is determined to be moving away from the device 100, or is determined to be sufficiently far from the device 100 the device 100 powers down the screen and/or locks the device 100. In some examples, powering down the screen and/or locking the device 100 is based on the security sensitivity.

Acoustically polling the environment includes emitting sound output through the speaker 122, receiving a reflected signal with the microphone 124, and analyzing the reflected signal to determine characteristics of the user. In some examples, this analysis includes comparing the emitted sound and the received sound to determine the time of maximum similarity or correlation between the emitted sound and the received sound, as well as the value of the maximum correlation between the emitted sound and the received sound.

Correlation between two sound signals means the similarity of those two sound signals. In some examples, the similarity is the similarity of the waveform (e.g., with the sound signal expressed as amplitude over time). In some examples, the similarity is the similarity of the frequency domain representations of the two sound signals. In some examples, this similarity is the cross-correlation of the emitted and reflected sounds, where the cross-correlation is a known mathematical technique for measuring the similarity between two signals. In some examples, the cross-correlation produces data including a comparison of correlation amplitude versus time. The time of maximum correlation is the time at which the maximum amplitude of the correlation occurs.

It should be understood that an emitted sound typically reflects from one or more objects in an environment back to the microphone. Because a typical environment often includes a fairly large number of different objects with different physical characteristics (e.g., size, shape, and acoustic characteristics), many different echoes can be received by the microphone. These echoes typically exhibit a good deal of similarity to the original emitted sound. Further, the time at which the echoes are detected, and the strength of the echoes depends on various features such as size and distance of the object from the microphone. A closer, larger object would produce an echo of a higher amplitude and at an earlier time than a smaller, farther object. Further, a closer, large object would produce an echo having a more similar waveform to the original sound than a farther object. Thus, for the situation where a close, large object is near to the device 100, the correlation of the reflected signal reflected off that close large object to the emitted signal has a higher magnitude and occurs at an earlier time than for the situation where a large object is not near to the device.

Because a user typically sits close to the device 100 when the device 100 is in use, a sufficiently high correlation magnitude that occurs at a sufficiently early time is indicative of the presence of a user. As a user moves away from the device 100, the peak correlation magnitude becomes smaller and occurs at a later time. When no user is present in the vicinity, the peak correlation is relatively lower and occurs later in time, as the correlation is determined by the echo of the emitted sound off of the ambient environment.

In some examples, a sufficiently high correlation magnitude is a correlation magnitude above a threshold. In some examples, this threshold is pre-programmed or is updated while the device 100 is in use. In some examples, the device 100 measures the correlation magnitude while the device is in use (e.g., while the device is receiving mouse or keyboard input) and sets that value as the threshold, or sets that value multiplied by some weight value (e.g., some percentage less than 100%, such as 80%) as the threshold. In some examples, a sufficiently early time is a time below a time threshold. In some examples, the time threshold is determined physically (e.g., based on the speed of sound and the typical distance of a user) or is measured dynamically in a similar manner as with the magnitude threshold.

In some examples, determining that a user is not detected or that the user is sufficiently far away from the device 100 includes determining that the maximum correlation is below the magnitude threshold, that the time of maximum correlation is after a threshold, or determining that a correlation above the correlation threshold does not occur before the threshold time. In some examples, determining that the user is moving away from the device includes determining that the peak correlation is getting smaller over time or that the time of maximum correlation is getting higher over time.

As described above, in some implementations, the user detect and power down technique includes powering down the device 100 in response to determining that a user is not detected, that the user is moving away, or that the user is sufficiently far from the device, and this powering down occurs according to a security sensitivity. In some examples, the security sensitivity adjusts the correlation amplitude threshold and/or the time threshold. In an example, a higher security sensitivity (meaning the device 100 detects a less secure environment) results in the correlation threshold being lowered, meaning that the device 100 is powered down with the user closer to the device 100 than if the security sensitivity were lower. In another examples, a higher security sensitivity results in the correlation time threshold being made lower. In such examples, the device 100 would power down upon detecting a correlation amplitude above a correlation threshold at an earlier time than in the situation that a lower security sensitivity were used. In other words, in some examples, with greater security sensitivity, the device 100 powers down with the user closer to the device 100 than with a lower security sensitivity.

In some examples, the security sensitivity has an effect on what actions the device 100 takes for the user detect and power down technique. More specifically, the device 100 could perform either or both of the following actions in response to detecting that a user is not present: locking the device and powering the display down (i.e., in response to detecting that a user is not detected, is determined to be moving away from the device 100, or is determined to be sufficiently far from the device 100). In some examples, where the security sensitivity is considered high (e.g., above a threshold), the device 100 prioritizes security over power savings. In some examples, where the security sensitivity is considered low (e.g., below a threshold), the device 100 prioritizes power savings over security. In some examples, prioritizing security means locking the device as soon as the user is not detected, is determined to be moving away, or to be sufficiently far from the device 100, with the display being powered down at that time or some subsequent time. In some examples, prioritizing power savings means shutting down the display and/or placing the device in standby without necessarily locking the device, or with locking the device at a subsequent time.

As described elsewhere herein, in the situation that the device 100 is powered down and the user is not detected to be sufficiently close to the device 100 or to be approaching the device 100, the device 100 periodically acoustically polls the environment to determine whether the user is returning to the device 100 or is sufficiently close to the device. The acoustic polling is similar to the acoustic polling for the user detect and power down technique. In some examples, the user is considered to be returning to the device 100 or sufficiently close to the device in the situation that the acoustic polling determines that the value of correlation between emitted and received sound is above a threshold (where the threshold is, in some examples, the same type of threshold as described with respect to the user detect and power down technique) prior to a time threshold or in the situation that the acoustic polling determines that the time of maximum correlation is lower than a time threshold (which, again, is the same type of threshold described with respect to the user detect and power down technique). In the situation that the user is considered to be returning to the device 100 or is sufficiently close to the device 100, the device 100 powers back up.

In some examples, the correlation threshold or for time threshold varies depending on the security sensitivity setting. For high security sensitivity (e.g., where the device 100 is in an open area and surrounded by a lot of people), the device 100 powers up with the user closer to the device 100 than for a low security sensitivity. Regarding the thresholds, for high security sensitivity, the correlation threshold is higher or the time of maximum correlation threshold is lower than for low security sensitivity.

Figures 2A, 2B:
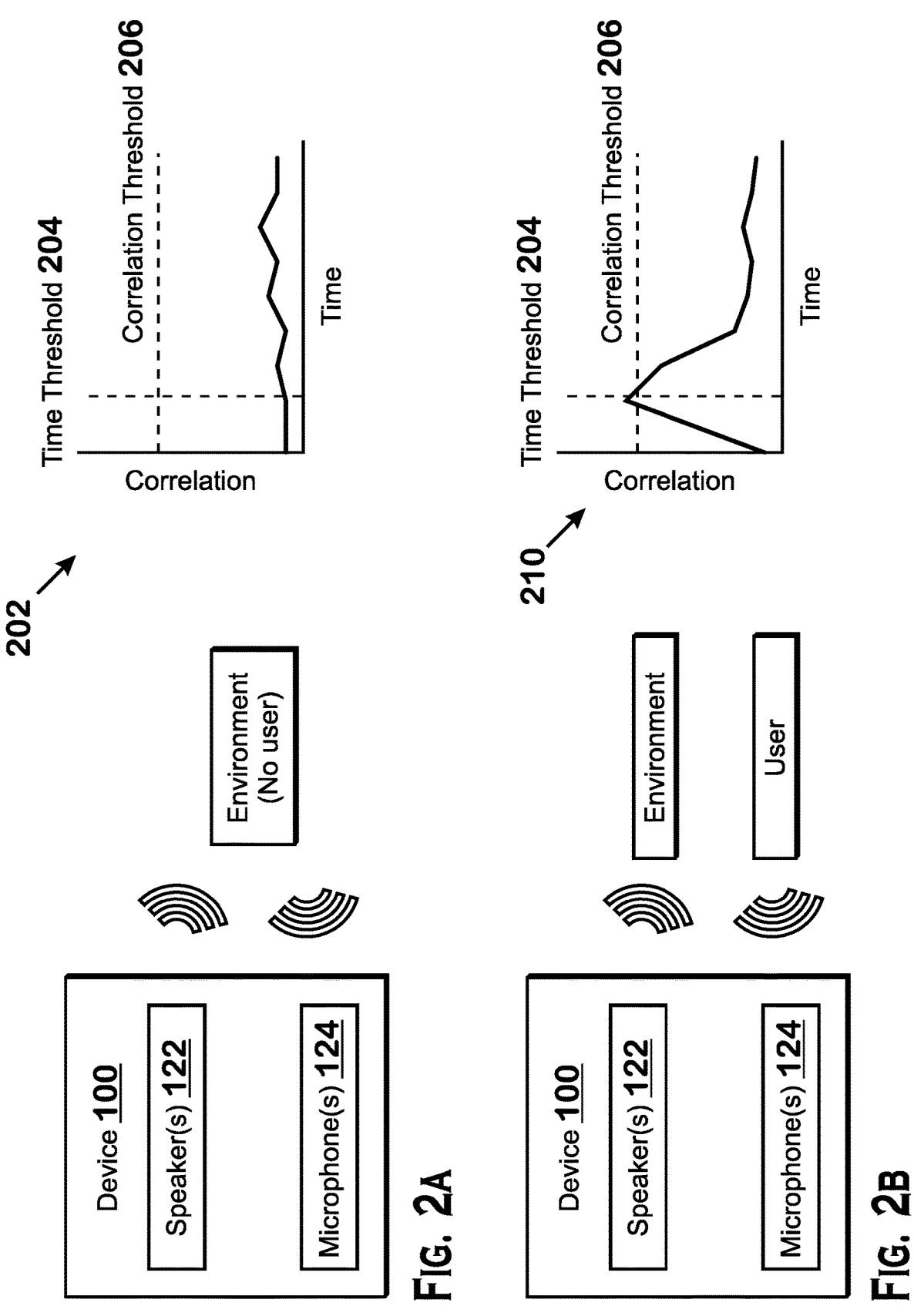
FIGS. 2A-2D illustrate examples of operations for the user detect and power down technique and/or the user detect and power on technique.

FIGS. 2A-2D illustrate examples of operations for the user detect and power down technique and/or the user detect and power on technique. FIG. 2A illustrates operations without a user present in the environment. As described elsewhere herein, for the user detect and power down technique, in response to the device 100 detecting that no user is present, the device 100 powers down (including, e.g., powering the display down and entering a power down mode such as a standby mode). For the user detect and power on technique, while the device 100 is powered down (but still powered on enough to perform the operations of FIG. 2A), in response to detecting no user present, the device 100 does not power the device on. FIG. 2B illustrates operations with a user present in the environment. Regarding the user detect and power on technique, while the device 100 is powered on and the device 100 detects a user, the device 100 does not power down. Regarding the user detect and power down technique, while the device 100 is powered down, in response to detecting a user, the device 100 powers up.

FIG. 2A illustrates operations associated with detecting no user in the environment. The device 100 causes the speaker(s) 122 to emit a sound. The sound reflects off of the environment, which does not include a user, and the microphone(s) 124 measure the reflected sound. Characteristics of the measured, reflected sound are illustrated in graph 202, which shows correlation versus time. The direction in which time progresses is to the right. Put more explicitly, this graph 202 illustrates the cross-correlation of the reflected signal and the emitted signal as time progresses.

As described elsewhere herein, the correlation indicates the degree of similarity of the reflected signal to the emitted signal at a particular point in time. A higher degree of correlation means that the reflected signal is more similar to the emitted signal than a lower degree of correlation.

A time threshold 204 and a correlation threshold 206 are shown. The time threshold indicates the time for which earlier correlation values above the correlation threshold indicate a user presence. The correlation threshold 206 indicates the correlation value for which higher values indicate presence of a user. In some examples, in the situation that the correlation value occurs before the time threshold and is above the correlation threshold, the device 100 determines that a user is detected. In some examples, if the time of maximum correlation is above the time threshold or the highest correlation value is below the correlation threshold, the device 100 determines that a user is not detected. In some examples, the correlation value before the correlation threshold does not need to be the maximum correlation. In other words, in the event that a correlation value above the correlation threshold occurs before the time threshold 204, the device 100 determines that a user is present.

In the specific data illustrated in the graph 202 FIG. 2A, there is no correlation value above the correlation threshold 206. Therefore, the device 100 would determine that a user is not present, given the data of the graph 202.

In FIG. 2B, the device 100 emits sound and captures reflected sound. The graph 210 illustrates that a correlation value over the correlation threshold 206 occurs before the time threshold 204. Thus, the device 100 determines that a user is present. Put differently, where a user is present, a large reflected sound will occur at a relatively early time. Such occurrence leads to a large correlation between emitted and received signals, as illustrated in graph 210.

Figure 2C:
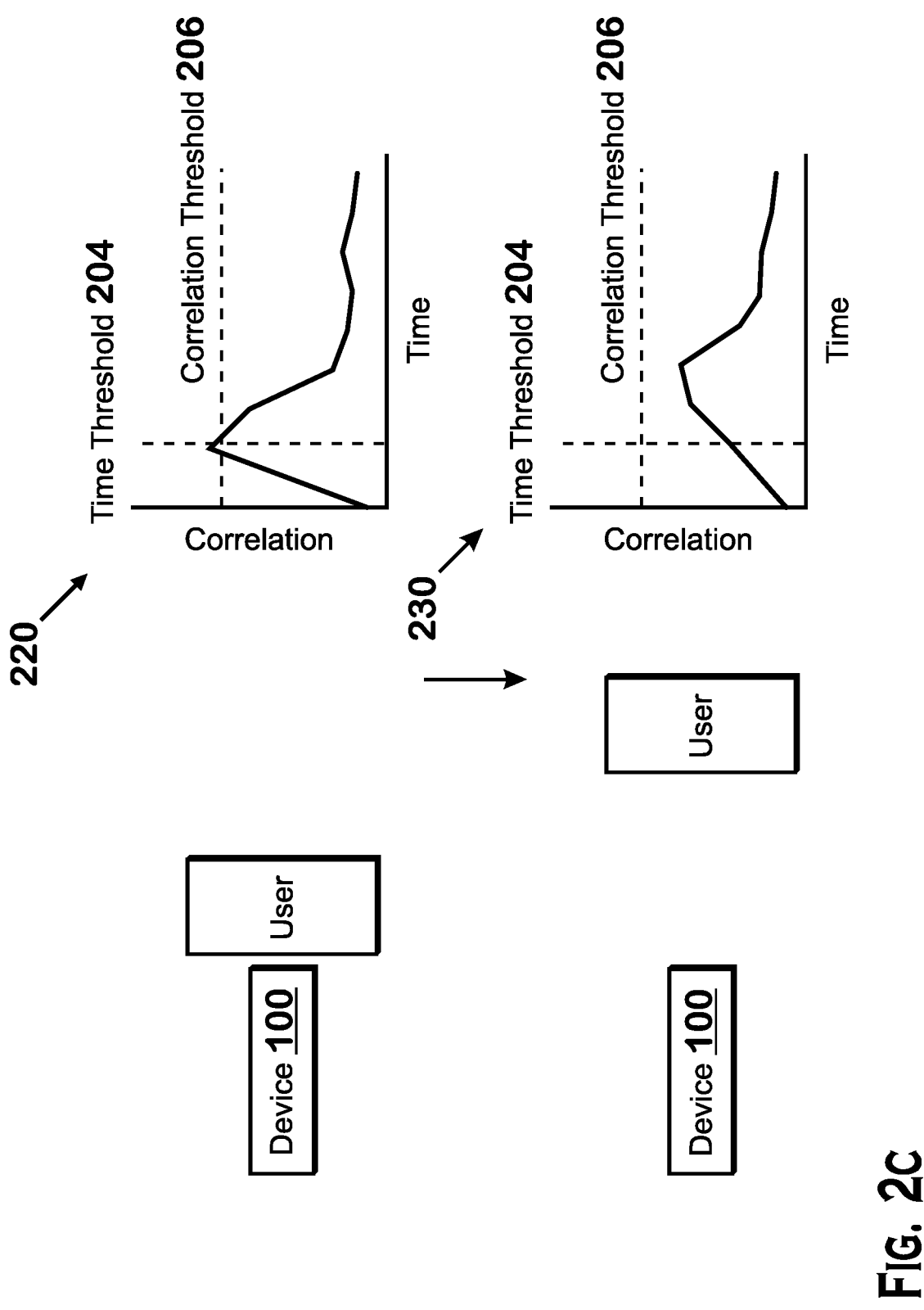

FIG. 2C illustrates the change in measured correlation as a user moves away from the device 100. Graph 220 reflects measurements with a user relatively close to the device 100 and graph 230 reflects measurements with a user farther from the device 100. As the user moves away from the device, the high correlation value gets lower and occurs later in time. In graph 230, the correlation value is lower than the correlation threshold 206 and the high correlation value occurs after the time threshold 204. By contrast, in graph 220, a correlation value higher than the correlation threshold 206 occurs prior to the time threshold 204. Thus, while graph 220 indicates presence of a user near to the device 100, graph 230 does not indicate presence of a user near to the device 100.

Figure 2D:
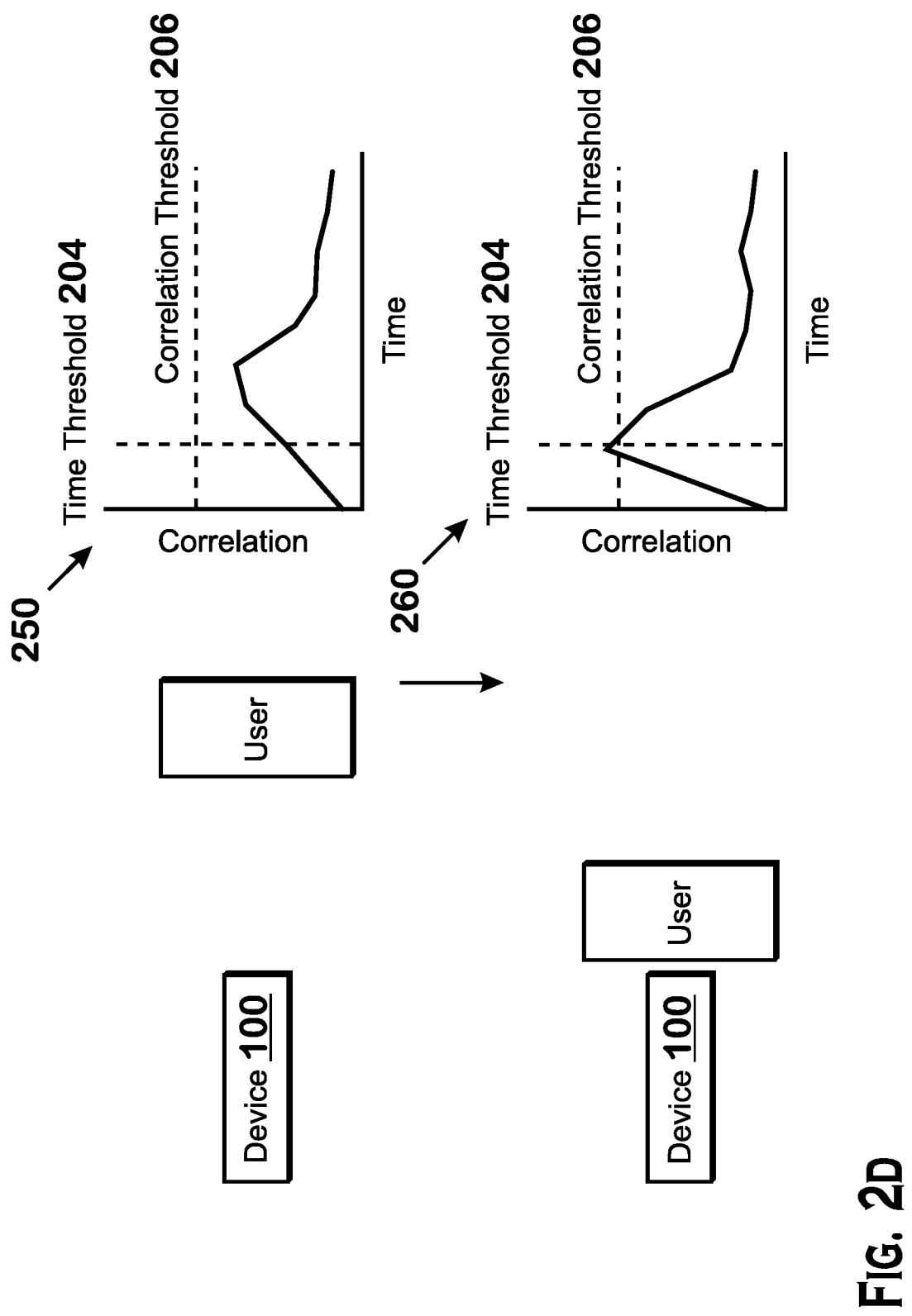

FIG. 2D illustrates the change in measured correlation as a user moves towards the device 100. Graph 250 illustrates a correlation value below the correlation threshold 206, and that the highest correlation value occurs after the time threshold 204. As the user moves towards the device 100, the correlation value increases and moves closer to the time threshold 204. In graph 260, the high correlation value is above the correlation threshold 206 at a time before the time threshold 204. Thus while graph 250 is reflective of a user not being considered sufficiently near to the device 100, graph 260 is reflective of the user being considered sufficiently near to the device 100.

As described elsewhere herein, it is possible for the device 100 to change one or both of the time threshold 204 and the correlation threshold 206 based on the security sensitivity. For example, as the device 100 becomes more sensitive to security issues, the correlation threshold 206 becomes higher and/or the time threshold 204 becomes lower, meaning that the user must be closer to the device in order for the device to consider the user to be present.

The adjust security sensitivity technique includes adjusting the security sensitivity based on analysis performed using an audio signal emitted from the speaker(s) 122 and/or captured by the microphone(s) 124. Specifically, the sound processing software 126 performs one or both of two techniques to determine what the security sensitivity should be. In a first of these techniques, the sound processing software 126 causes the speaker(s) 122 to emit sound signals to be captured by the microphone(s) 124 for mapping the environment in the vicinity of the device 100. In a second of these techniques, the microphone(s) 124 capture the ambient sounds without any sounds being emitted by the speaker(s) 122. The ambient sounds are the sounds generated by the environment itself, such as people talking or moving around. Based on one or both of these two techniques, the sound processing software 126 determines a security sensitivity for the device 100.

In some examples, the device 100 performs the technique of mapping the environment in the following manner. The device 100 generates a series of directed sounds emitted from the speakers 122. To direct a sound, the speakers 122 include two or more speakers that are substantially spaced apart (such as at left and right sides of the device 100). The device 100 sets the phase of the sound from each speaker to be slightly different. The difference in phase determines the direction of the emitted sound. By varying the phase difference and emitting sound with each phase difference, the device 100 obtains a reflected sound with the microphone for each different direction. The device 100 compares each reflected sound to the sound that was emitted in order to generate the sound, to determine physical characteristics of the environment in the associated direction. In some examples, the comparison includes determining reverberation characteristics of the reflected sound. In some examples, reverberation characteristics are a measure of the degree to which the emitted sound echoes in the environment. Reverberation is detected by observing a similar sound signal to the emitted sound decaying over time in the signal obtained with the microphone. A high degree of reverberation is consistent with a more enclosed area with hard surfaces, and a lower degree of reverberation is consistent with a more open area and/or an area with surfaces that absorb acoustic energy. The result of the technique for mapping the environment is a set of reverberation characteristics for a plurality of directions with respect to the device 100.

In some examples, the technique for capturing and analyzing ambient sounds is performed as follows. The device 100 causes the microphones 124 to capture ambient sounds for a given amount of time, provides the captured signals to an analyzer (such as the sound processing software 126), and characterizes the sounds. In some examples, the characterization includes characterizing the ambient sounds as indicating a secure environment or a not secure environment. In some examples, the characterization includes characterizing the ambient sounds with a security score. The device 100 uses any technically feasible technique for characterizing the ambient sounds. In various examples, the device 100 characterizes the security of the environment based on the type of sounds observed. In an example, the sounds include the voices of several people and the device 100 characterizes the environment as having low security. In another example, the sounds include the sounds of movement and working of a single person, and the device 100 characterizes the environment as having high security. In some examples, the device 100 includes a trained neural network that classifies the security of the environment based on the sounds of the environment. In some examples, the trained neural network is trained by providing labeled audio samples to a network, where the labels include the security of the environment associated with the audio samples.

In some examples, the device 100 utilizes both the ambient audio and the reflected audio to characterize the security of the environment. In some examples, the trained neural network accepts as input both the ambient audio and the reflected audio and characterizes the security of the environment based on those inputs.

In some examples, where the device 100 determines that the environment is sufficiently unsecure, the device 100 presents a notification to the user that the environment is unsecure. In various examples, this notification is a window or other visual notification on the screen of the device, an auditory notification, a combination thereof, and/or including some other type of notification.

Figure 3:
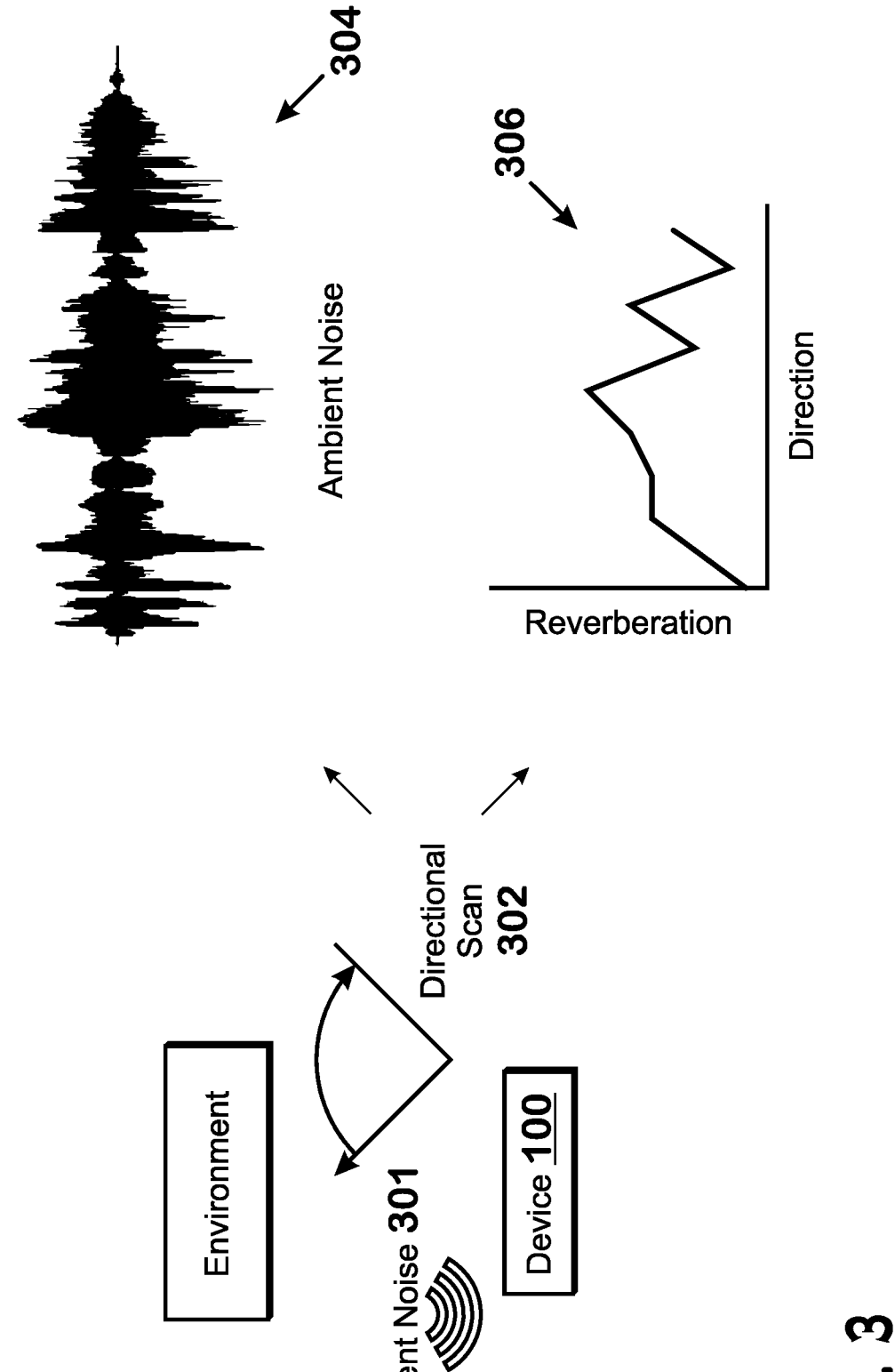
FIG. 3 illustrates operations for adjusting a security sensitivity of the device, according to an example.

FIG. 3 illustrates operations for adjusting a security sensitivity of the device 100, according to an example. The device 100 senses ambient noise 301 from the environment and performs a directional scan 302 as described elsewhere herein. The graph 304 illustrates the ambient noise 301 sensed from the environment and the graph of reverberation data 306 illustrates direction versus reverberation of the reflected scan sensed with the directional scan 302. The device 100 analyzes the ambient noise 304 and/or the reverberation data 306 to determine a security sensitivity for the device 100. As described elsewhere herein, the device 100 uses any technically feasible means to perform this activity. In some examples, a trained neural network of the device 100 accepts the ambient noise 304 and/or the reverberation data 306, processes that information, and generates a security sensitivity. In other examples, a pre-programmed heuristic that accepts either or both of the ambient noise 304 and the reverberation data 306 and generates a security sensitivity in response. Any other technically feasible means for generating the security sensitivity based on the ambient noise 304 and/or the reverberation data 306 can be used. In some examples, reverberation characteristics indicating a more open environment results in a classification of a less secure area and reverberation characteristics indicating a less open environment results in a classification of a more secure area.

In some examples, the device 100 performs automatic equalizer adjustments. In some examples, performing the equalizer adjustments includes emitting an acoustic signal via the speaker(s) 122, receiving a signal reflected from the environment with the microphone(s) 124, analyzing the reflected signal, and adjusting the equalizer based on the analyzing.

In some examples, analyzing the reflected signal includes determining which frequencies have a high degree of reverberation (in some examples, "high" means above a threshold). Reverberation is the repeated echo of sound in an environment. The device 100 determines which frequencies have a relatively high degree of reverberation and adjusts the equalizer to reduce the amplitude of the sound emitted by the microphone(s) 124 in those frequencies. This equalizer controls general sound output by the device 100 (for example, operating system sound effects, application sound, played music or movie sound, or any other sound). In some examples, a high degree of reverberation is reverberation above a threshold. In some examples, the threshold is a pre-set threshold, is a user-adjusted threshold, or is a dynamically determined threshold. This technique helps to adjust the sound output of the device 100 to be more pleasing to a user.

Figure 4:
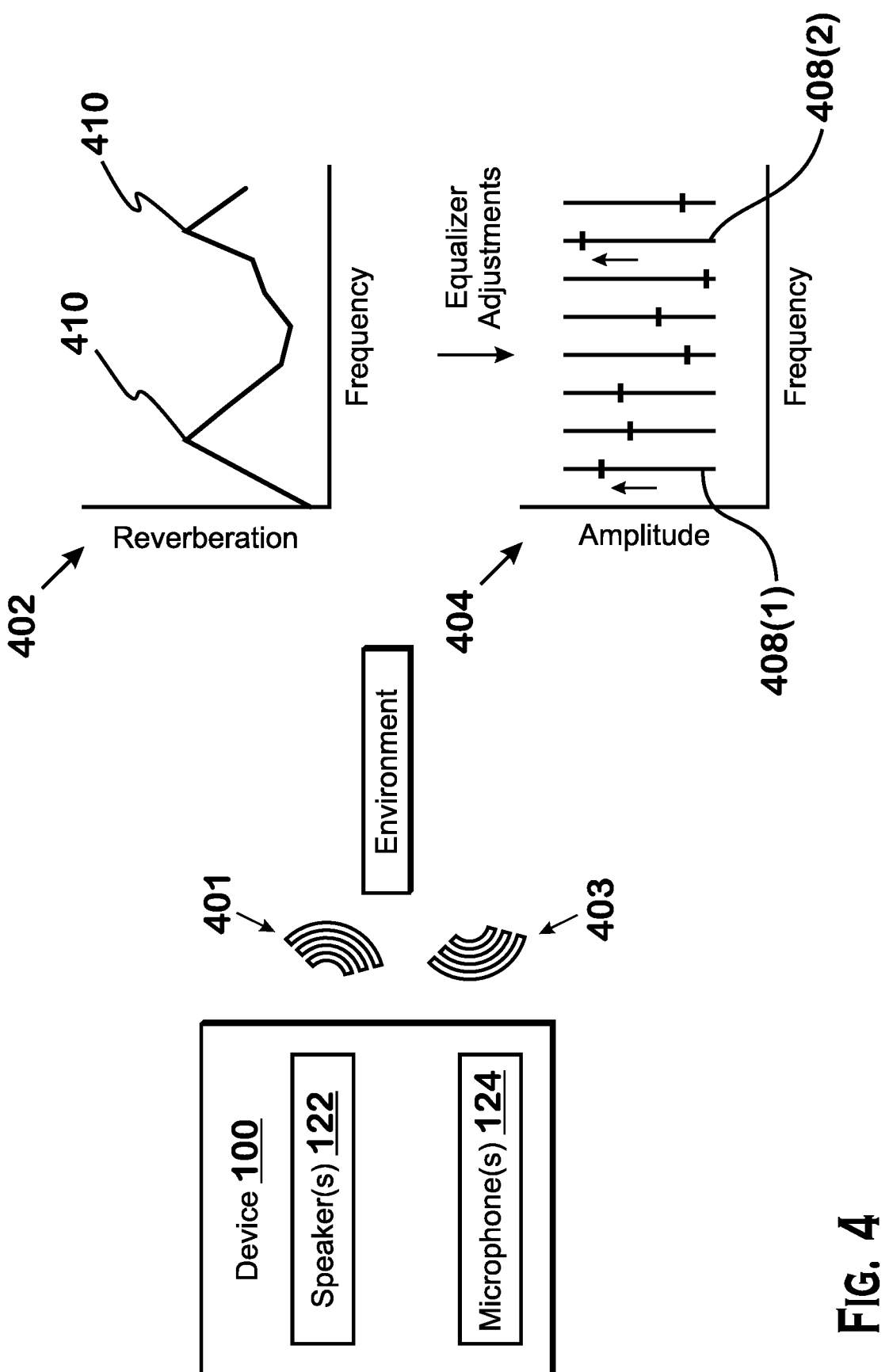
FIG. 4 illustrates operations for equalizer adjustment, according to an example.

FIG. 4 illustrates operations for equalizer adjustment, according to an example. According to the operation, the device 100 causes the speaker(s) 122 to emit a sound signal 401 to the environment and receives a reflected signal with the microphone(s) 124. Reverberation data 402 illustrates the reverberation versus frequency. That is, the reverberation data 402 indicates, for each frequency of a set of frequency, how much reverberation is measured. As described elsewhere herein, the reverberation is the measure of echoes of the emitted sound in the environment. The device 100 makes equalizer adjustments in response to the reverberation data 402. The equalizer adjustments are adjustments to the equalizer, which controls the sound output from the device 100. An equalizer applies an amplitude adjustment to each of a set of frequencies. The amplitude adjustments increase or decrease of the amplitude of the respective frequencies in the sound output from the speaker(s) 122. The device 100 reduces the amplitude of frequencies for which high reverberation is detected. In the example of FIG. 4, the device 100 increases frequency 1 408(1) and 408(2) due to the high reverberations 410 illustrated.

Figure 5:
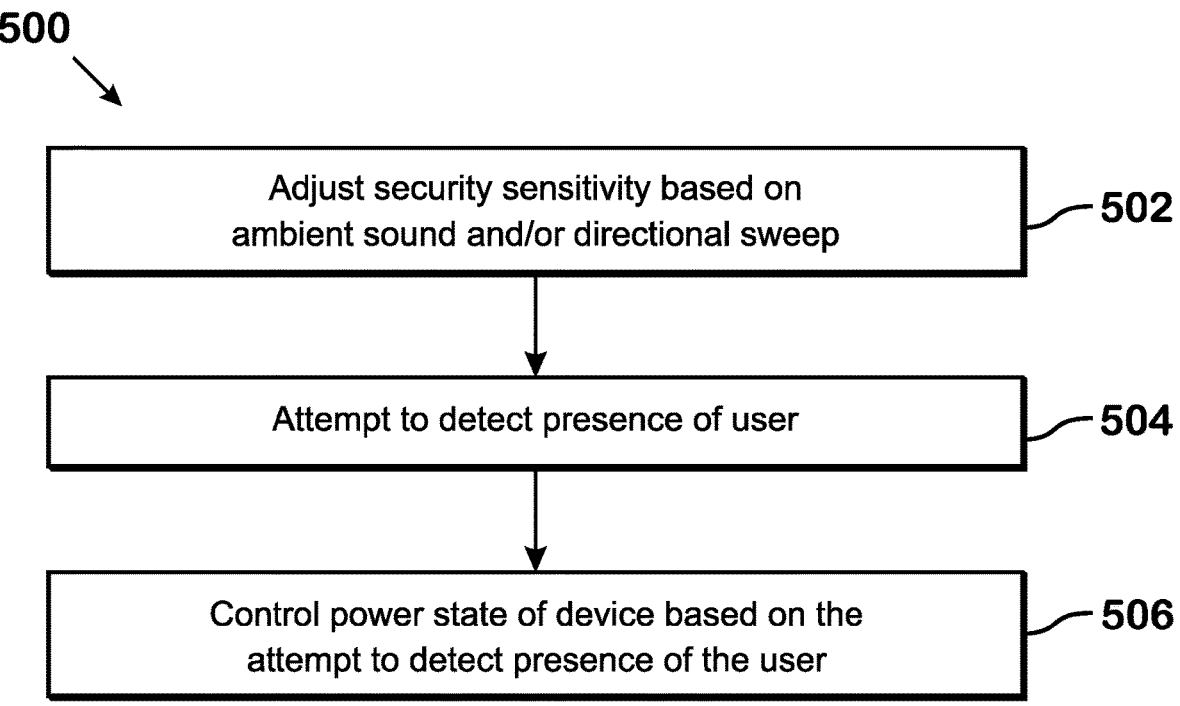
FIG. 5 is a flow diagram of a method for operating a device, according to an example.

FIG. 5 is a flow diagram of a method 500 for operating a device 100, according to an example. Although described with respect to the systems of FIGS. 1-4, those of skill in the art will understand that any system, configured to perform the steps of the method 500 in any technically feasible order, falls within the scope of the present disclosure.

At step 502, the device 100 adjusts a security sensitivity based on ambient sound and/or a directional sweep. In some examples, the device 100 performs this step as described with respect to FIGS. 1 and 3. In some examples, the device 100 obtains a recording of the ambient noise, and performs a directional sweep. The directional sweep includes varying the directionality of the sound emitted from the speaker(s) 122 (e.g., by varying the phase difference) and recording the sound received with the microphone(s) 124 which is reflected from the environment. As described elsewhere herein, the device 100 characterizes the environment with a particular security sensitivity based on the ambient noise and/or the reflected sound recorded with varying the directionality of emitted sound. Various techniques for generating the security sensitivity are described elsewhere herein.

At step 504, the device 100 attempts to detect presence of a user. Various techniques for detecting presence of a user are discussed with respect to FIGS. 2A-2D. In an example, the device 100 emits sound with the speaker(s) 122 and detects reflected sound with the microphone(s) 124. In an example, the device 100 determines correlation of the emitted and received sounds over time and determines presence of a user based on this correlation. In an example, if the correlation is above a correlation threshold 206, then the device 100 deems a user to be detected. In an example, if the correlation is above a correlation threshold 206 prior to a time threshold 204, then the device 100 deems a user to be detected. In an example, if the device 100 determines that the correlation is never above a correlation threshold 206 or that the correlation is not above the correlation threshold 206 prior to a time threshold 204, then the device deems a user to not be detected.

At step 506, the device 100 controls power state of the device based on the attempt to detect presence of the user. In one example, the device is already powered down and the device 100 detects presence of a user. In response, the device 100 powers the device on. In various such examples, the device 100 is in a low power mode such as a standby mode, where the device is still performing some operations but with reduced power and performance (for example, with processing circuitry (e.g., CPU) operating in a low-power mode). In response to detecting presence of a user, the device 100 powers up from the standby mode to a normal operation mode. In some examples, the device 100 is operating with a display powered off and in response to detecting presence of a user, the device 100 powers the display on. In some examples, the security sensitivity affects when the device is powered on. More specifically, with a low security sensitivity (meaning the device 100 is in a secure location), the device 100 powers the system on earlier than with a high security sensitivity. In some examples, the security sensitivity controls the time threshold 204 and/or the correlation threshold 206. More specifically, in some examples, where the security sensitivity is high, the time threshold 204 is adjusted lower so that the correlation above the threshold is required to occur earlier in time, indicating that a user is closer to the device, than if the security sensitivity is low. Put differently, with a high security sensitivity, the device 100 detects the user being closer to the device before powering on.

In another example, the device is powered on and the device 100 detects that the user is no longer present. In response, the device 100 powers the device 100 down. In various examples, powering down the device 100 includes shutting down the display and/or placing the device into a low power mode such as standby mode. In some examples, the security sensitivity controls the time threshold 204 and correlation threshold 206. For example, where the security sensitivity is high, the time threshold 204 is made earlier and/or the correlation threshold 206 is made higher, so that the device 100 is powered down more quickly than where the security sensitivity is low. In some examples, a high security sensitivity results in the device 100 locking the device 100 (e.g., placing the device 100 into a state that prohibits use until being unlocked, using, for example, credentials such as a password, biometric data, or other data) before the device 100 shuts down the screen or gets placed into standby. In some examples, a low security sensitivity results in the device powering down the screen and subsequently or concurrently placing the device 100 into standby.

In some examples, it is not necessary for the device 100 to adjust the security sensitivity before attempting to detect presence of a user and/or control the power state. For example, it is possible for the device 100 to attempt to detect presence of a user and control power state of the device without adjusting the security sensitivity.

In some examples, in addition to the steps of method 500, the device 100 adjusts an equalizer as described with respect to FIG. 4.

Various operations are described herein as being performed by the device 100. In various alternatives, such operations are performed by one or more of software, hardware (e.g., a processor or circuit), or a combination thereof, within the device 100. For example, a processor, software, or combination of processor and software operating within the device 100 can perform any of the operations described as being performed by the device 100 herein. In some examples, any operations described as being performed by the sound processing software 126 are alternatively performed by such software, hardware, or combination thereof. In some examples, the operations described herein as being performed by the device 100 or the sound processing software 126 are performed by a sound processor. In some examples, the sound processor is hardware circuitry, software executing on a processor, a hardware processor (e.g., a fixed function processor), or a programmable processor.

It should be understood that many variations are possible based on the disclosure herein. Although features and elements are described above in particular combinations, each feature or element can be used alone without the other features and elements or in various combinations with or without other features and elements.

The various units described herein are software executing on a processor, hardware (such as a fixed function processor, programmable processor, circuit, or other hardware), or a combination of software and hardware. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for operating a device, the method comprising:

setting a time threshold and correlation amplitude threshold for user detection based on a security sensitivity that indicates a level of security of a surrounding environment;

emitting audio from a speaker of the device and receiving, with a microphone of the device, audio signals reflected based on the emitted audio from one or more objects in an environment of the device;

analyzing for presence of a user based on the reflected audio signals, the analyzing comprising determining whether a time of threshold correlation between the audio emitted from the speaker and the audio signals reflected from the one or more objects in the environment is below the time threshold, wherein the time of threshold correlation comprises a time at which the audio emitted from the speaker and the audio signals reflected from the one or more objects is above the correlation amplitude threshold; and controlling power state of the device based on the analyzing.

2. The method of claim 1, further comprising:

adjusting the security sensitivity for the device based on one or both of ambient noise and reflected sound, wherein controlling the power state is based on the security sensitivity.

3. The method of claim 2, wherein adjusting the security sensitivity based on the reflected sound comprises determining reverberation characteristics for a set of emitted sounds emitted with varying direction.

4. The method of claim 1, wherein analyzing for presence of the user comprises determining that a user is present in response to the time of threshold correlation being below the time threshold.

5. The method of claim 1, wherein analyzing for presence of the user comprises determining that a user is not present in response to the time of threshold correlation being above the time threshold.

6. The method of claim 1, wherein controlling the power states includes powering down the device in response to detecting absence of a user or powering up the device in response to detecting presence of a user.

7. The method of claim 1, further comprising adjusting equalizer settings based on reverberation characteristics of an environment.

8. A device comprising:

a microphone;

a speaker; and a sound processing controller, configured to:

set a time threshold and correlation amplitude threshold for user detection based on a security sensitivity that indicates a level of security of a surrounding environment;

emit audio from the speaker and receiving, with the microphone, audio signals reflected based on the emitted audio from one or more objects in an environment of the device;

analyze for presence of a user based on the reflected audio signals, the analyzing comprising determining whether a time of threshold correlation between the audio emitted from the speaker and the audio signals reflected from the one or more objects in the environment is below the time threshold, wherein the time of threshold correlation comprises a time at which the audio emitted from the speaker and the audio signals reflected from the one or more objects is above the correlation amplitude threshold; and control power state of the device based on the analyzing.

9. The device of claim 8, wherein the sound processing controller is further configured to adjust the security sensitivity for the device based on one or both of ambient noise and reflected sound, wherein controlling the power state is based on the security sensitivity.

10. The device of claim 9, wherein adjusting the security sensitivity based on the reflected sound comprises determining reverberation characteristics for a set of emitted sounds emitted with varying direction.

11. The device of claim 8, wherein analyzing for presence of the user comprises determining that a user is present in response to the time of threshold correlation being below the time threshold.

12. The device of claim 8, wherein analyzing for presence of the user comprises determining that a user is not present in response to the time of threshold correlation being above the time threshold.

13. The device ystem of claim 8, wherein controlling the power states includes powering down the device in response to detecting absence of a user or powering up the device in response to detecting presence of a user.

14. The device of claim 8, wherein the sound processing controller is further configured to adjust equalizer settings based on reverberation characteristics of an environment.

15. A non-transitory computer-readable medium storing instructions that, when executed by a processor, cause the processor to perform operations comprising:

setting a time threshold and correlation amplitude threshold for user detection based on a security sensitivity that indicates a level of security of a surrounding environment;

emitting audio from a speaker of the device and receiving, with a microphone of the device, audio signals reflected based on the emitted audio from one or more objects in an environment of the device;

analyzing for presence of a user based on the reflected audio signals, the analyzing comprising determining whether a time of threshold correlation between the audio emitted from the speaker and the audio signals reflected from the one or more objects in the environment is below the time threshold, wherein the time of threshold correlation comprises a time at which the audio emitted from the speaker and the audio signals reflected from the one or more objects is above the correlation amplitude threshold; and control power state of the device based on the analyzing.

16. The non-transitory computer-readable medium of claim 15, wherein the operations further comprise adjusting the security sensitivity for the device based on one or both of ambient noise and reflected sound, wherein controlling the power state is based on the security sensitivity.

17. The non-transitory computer-readable medium of claim 16, wherein adjusting the security sensitivity based on the reflected sound comprises determining reverberation characteristics for a set of emitted sounds emitted with varying direction.

18. The non-transitory computer-readable medium of claim 15, wherein analyzing for presence of the user comprises determining that a user is present in response to the time of peak correlation being below the time threshold.

19. The non-transitory computer-readable medium of claim 15, wherein analyzing for presence of the user comprises determining that a user is not present in response to the time of peak correlation being above the time threshold.

20. The non-transitory computer-readable medium of claim 15, wherein controlling the power states includes powering down the device in response to detecting absence of a user or powering up the device in response to detecting presence of a user.

* * * * *